United States Patent [19]

Dyer

[11] Patent Number: 4,570,956
[45] Date of Patent: Feb. 18, 1986

[54] APPARATUS FOR CONVERTING A CAR SEAT TO A STROLLER

[76] Inventor: Gloria Dyer, 6507 Milam Way, North Higlands, Calif. 95660

[21] Appl. No.: 651,177

[22] Filed: Sep. 17, 1984

[51] Int. Cl.⁴ .............................................. B62B 1/04
[52] U.S. Cl. .................................... 280/30; 16/38; 280/47.25; 280/47.38; 297/130
[58] Field of Search ................ 280/30, 7.14, 79.1 R, 280/79.1 A, 79.2, 40, 39, 643, 47.25, 47.38; 16/38, 39, 43; 297/130, 250, DIG. 4

[56] References Cited

U.S. PATENT DOCUMENTS

| 605,162 | 6/1898 | Deane | 280/47.13 R |
| 2,558,144 | 6/1951 | McComie | 280/35 |
| 2,720,911 | 10/1955 | Lantz | 297/130 X |
| 3,116,069 | 12/1963 | Dostal | 280/648 X |
| 3,829,113 | 8/1974 | Epelbaum | 280/30 |
| 3,944,241 | 3/1976 | Epelbaum | 280/30 |

Primary Examiner—Joseph F. Peters, Jr.
Assistant Examiner—Michael Mar
Attorney, Agent, or Firm—Mark Jacobs

[57] ABSTRACT

Apparatus for converting a conventional car seat including a wheeled structure removably attached to the car seat for converting the same to a stroller. In one embodiment, the original car seat can be provided with attaching structure permanently attached thereto for quickly and easily connecting or removing the wheeled structure. In another embodiment, structure for carrying out the same can be added to the original structure.

1 Claim, 9 Drawing Figures

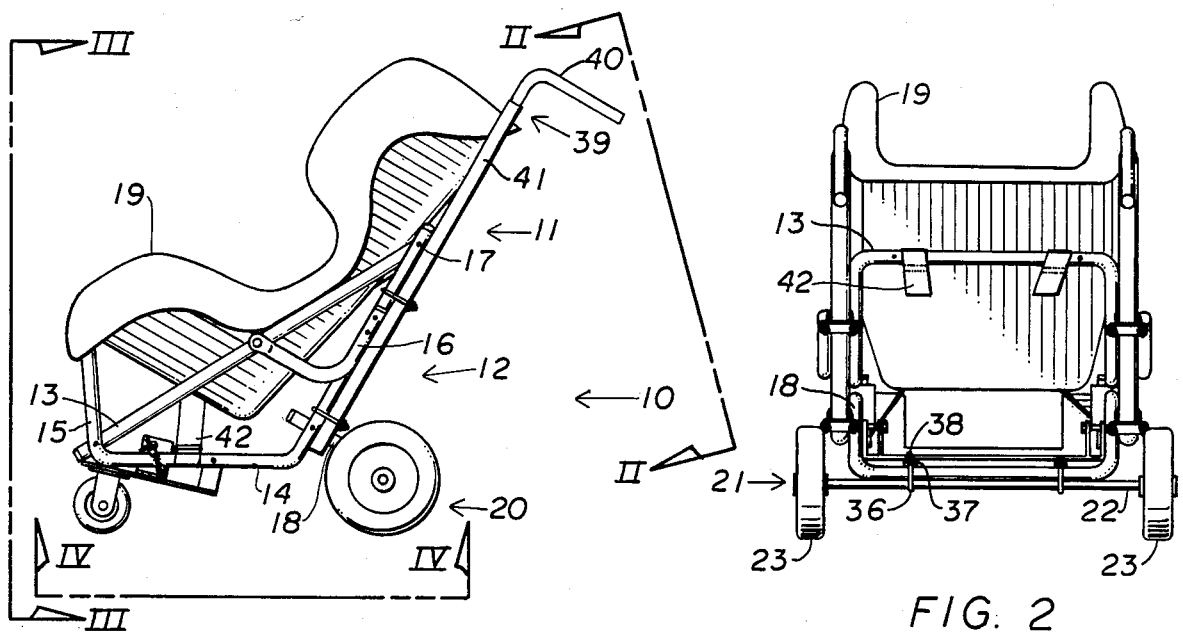
FIG. 1
FIG. 2
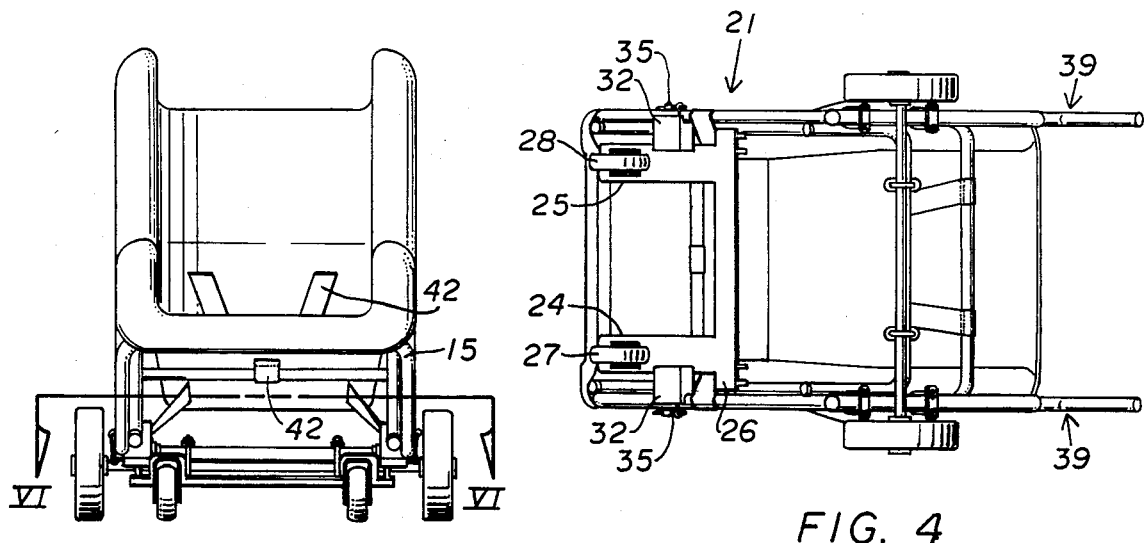
FIG. 3
FIG. 4
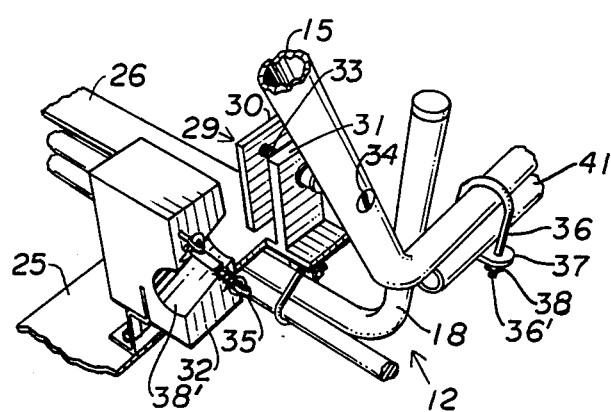
FIG. 5

APPARATUS FOR CONVERTING A CAR SEAT TO A STROLLER

BACKGROUND OF THE INVENTION

1. Field of the Invention

The invention relates to car seats and strollers; and, more particularly, to apparatus for converting a conventional car seat to a stroller.

2. Description of the Prior Art

There has been increased interest in recent years in car seats for babies. Although wheeled strollers have been known and used for years to transport babies and small children, car seats have not had the same popularity. However, safety factors, and laws to enforce the same, have increased the use of car seats.

Such car seats and strollers are relatively expensive. It may be beyond the means of many people to purchase both a car seat and a stroller. However, both have one thing in common—a seat portion for the baby or small child. In U.S. Pat. No. 3,829,113, a combined children's car seat and stroller is shown. However, such device requires a cumbersome wheeled frame which must be stored when the device is used as a car seat. Also, the car seat must be assembled to the wheeled frame by straps.

There is thus a need for apparatus which can be used to convert a car seat quickly and easily to a stroller.

SUMMARY OF THE INVENTION

It is an object of this invention to provide apparatus for quickly and easily converting a car seat to a stroller.

It is a further object of this invention to provide such apparatus which includes an attaching portion permanently attached to the frame of a conventional car seat.

It is still further an object of this invention to provide such apparatus which is totally separable from the car seat.

These and other objects are preferably accomplished by providing attaching structure which may be either permanently attached to the existing car seat or easily removable therefrom. Such structure includes a rear wheel assembly, a handle assembly and a front wheel or roller assembly.

BRIEF DESCRIPTION OF THE DRAWING

FIG. 1 is a side vertical view of a combined car seat and stroller in accordance with the invention;

FIG. 2 is a rear oblique view taken at II—II of a portion of the apparatus of FIG. 1;

FIG. 3 is a front vertical view of the apparatus of FIG. 1;

FIG. 4 is a bottom plan view of the apparatus of FIG. 1;

FIG. 5 is a perspective view of a portion of the front and rear undercarriages of the apparatus of FIG. 1;

DESCRIPTION OF THE PREFERRED EMBODIMENT

Figure 6:
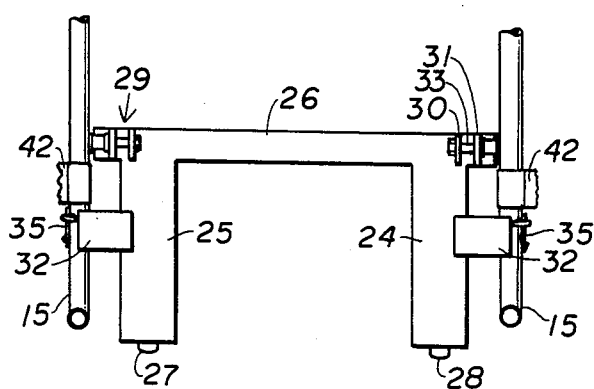
FIG. 6 is an enlarged front sectional view of the apparatus of FIG. 1.

Referring now to FIG. 1 of the drawing, a conventional car seat and stroller attachment therefor is shown as a combination car seat stroller 10. The car seat portion 11 is conventional and includes a framework 12 which may vary from car seat to car seat. In the car seat version illustrated, framework 12 includes conventional tubing extending along the back of the framework (portion 13—FIG. 2), downwardly from each end toward the front forming side portions-side portion 14 along the bottom in FIG. 1 (a like portion on the opposite side not visible in FIG. 1) where each side portion is interconnected to an upright U-shaped front portion 15 (FIGS. 1 and 3). Curved side braces 16 are interconnected to side portions 14 and front braces 13 are interconnected to the U-shaped front tubing 15 all as shown in FIG. 1. A rear U-shaped tubing 18 (FIG. 2) is secured to back frame portion 13.

The framework 12 may also include other portions and may be secured together in any suitable manner, such as by rivets 17. The car seat portion 11 shows a conventional car seat 19 mounted in framework 12.

Enough of the framework has been disclosed in order to carry out the teachings of the invention. As heretofore indicated, the car seat portion 11 is of conventional design and forms no particular part of the invention. Thus, the framework 12 may be of one unitary piece, of separable parts, collapsible, etc., all such versions coming within the teachings of the invention.

Referring again to FIG. 1, apparatus 20 is disclosed for quickly and easily converting car seat portion 11 to a wheeled stroller. In the preferred embodiment, such apparatus 20 includes a wheeled understructure 21 (see particularly FIG. 4) including an axle 22 (FIG. 2) with wheels 23 journalled for rotation thereon at each end. Understructure 21 is comprised of a U-shaped frame having a pair of spaced legs 24,25 interconnected by a bar or rod 26. As seen in FIG. 6, intermediate upstanding flanges 59 may be provided for added support. Casters 27,28 are secured to the underside of each leg 24,25 in any suitable manner. As seen in FIG. 5, upstanding brackets 29 (only one visible) are provided at each end of bar or rod 26. Brackets 29 are comprised of spaced flanges 30,31 to provide vertical support. Threaded bolts 33 extend through aligned apertures in flanges 30,31. The heads 34 of bolts 33 may abut against framework side 14 as shown in FIG. 5 to provide both spacing and support. At the front of car seat portion 11, one or more wooden blocks 32 (FIG. 6) may be secured to one side of the framework 12 in any suitable manner, such as by eyelets and hooks 35 (see also FIG. 1) securing blocks 32 to the framework 12. The blocks 32 closest to the framework sides may have a cavity 38' therein receiving the framework 12 holding the blocks 32 in vertical position. Thus, blocks 32 will rest on top of the legs 24,25 when car seat portion 11 is in the FIG. 1 position.

As particularly contemplated in the present invention, the wheeled understructure 21 is quickly and easily removable from the car seat portion 11. This is accomplished by a plurality of U-shaped members 35 (FIG. 5) having threaded ends 36 (see also FIG. 4) extending through apertures in a plate 37 with nuts 38 threaded on ends 36. As seen in FIGS. 1, 2 and 5, these members 35 encircle axle 22 (FIGS. 2 and 5) and the lower portion back tubing of framework 12. Members 35 also encircle a pair of spaced upright tubings 39 (FIGS. 1 and 2) and the side framework 14 of framework 12. Tubings 39 may be formed of telescoping sections 40, 41, as shown, with upper section 40 extending rearwardly and generally horizontally to form a handle. As also seen in FIGS. 1, 3, 4 and 6, a plurality of straps 42 are provided on car seat portion 11 and used to secure the understructure 21 to the framework 12.

Figure 7:
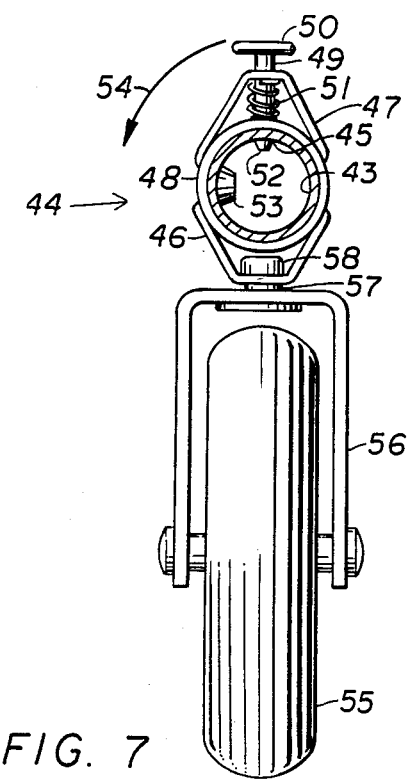
FIG. 7 is a vertical view, partly in section, of a modification of the roller assembly of the embodiment of FIGS. 1 to 6.

The foregoing describes a wheeled understructure 21 that can be quickly and easily added to a preexisting car seat. Apparatus may be provided on any suitable car seat at the factory so that rollers or the like may be quicly and easily provided on the car seat. For example, as shown in FIG. 7, it can be seen from FIG. 6 that the car seat disclosed therein includes front and rear tubings as part of the framework. Thus, assuming tubing 43 in FIG. 7 represents front tubing on the understructure of the car seat of FIGS. 1 to 6, a front roller connecting assembly 44 is provided on tubing 43 (it being understood that any suitable number may be provided). Tubing 43 is to be understood also as having a plurality of apertures 45 therein at spaced locations, generally located where the rollers would be located). Assembly 44 includes a pair of flanges 46, 47 on opposite sides of a collar 48. Collar 48 slides along tubing 43 and flanges 46, 47 are welded or otherwise secured to collar 48. A pin 49, having an enlarged head 50, extends through an aperture in flange 47 and then through aperture 45 in tubing 43. A spring 51 surrounds pin 49 between flange 47 and collar 48 normally biasing pin 7 in the FIG. 7 position. Pin 49 is shown as terminating in an end 52 inside of tubing 43; however, a cavity, such as cavity 53, may be provided instead of an aperture 45. Since collar 48 rotates about tubing 43, pin 49 can be pulled away from its engagement in aperture 45, against the bias of spring 51, and rotated or moved 90 degrees, as seen by arrow 54, with the end 52 entering cavity 53 for storage of assembly 44. A roller 55 is journalled for rotation in a box-like flange 56 having a pin 57 receivable in an aperture in flange 56 and retained therein by enlarged head 58. Pin 57 swivels in flange 56 and roller 55 can rotate. When pin 49 is released and moved to lock into cavity 53, as heretofore discussed, roller 55 moves to a position opposite cavity 53 and thus out of engagement with the supporting surface on which the car seat may be resting for storage or the like. The rear wheels may be provided as heretofore discussed with respect to FIGS. 1 to 6. In this manner, no further components are necessary for converting the car seat to a stroller although handles similar to tubings 39 may be provided and secured as heretofore discussed.

It can be seen that I have disclosed a car seat-stroller combination that combines the safety of a child's car seat with the mobility of a stroller in a convenient and economical manner. The device can be used as a regular car seat when the wheels are retracted or used as a stroller by merely unfolding the wheels and adjusting the handles.

The handles or tubing 39 may be provided with inner locking spring mechanisms, as is well known in the art, for automatic height adjustment. The size of the wheels is a matter of choice and may be larger, if desired.

Figure 8:
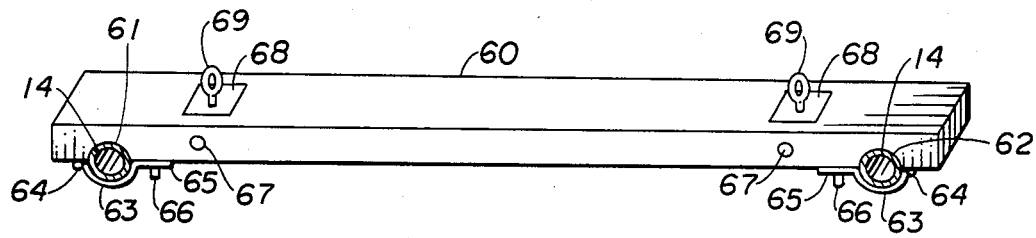
FIG. 8 is a perspective view of a portion of the apparatus for adding rollers to the car seat portion of the embodiment of FIGS. 1 to 6.
Figure 9:
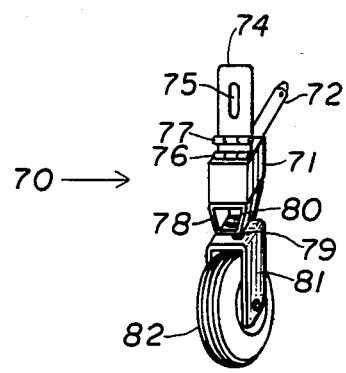
FIG. 9 is a perspective view of a roller assembly receivable in the apparatus of FIG. 8.

As shown in FIGS. 8 and 9, another modification of a conversion kit for converting a conventional car seat to a stroller is illustrated. In this modification, an elongated generally rectangular bar or support member 60 is shown having a pair of spaced cavities 61, 62 on the undersurface for receiving therein side tubings 14 of the car seat portion 11 of FIG. 1. C-shaped clamps 63 are pivotally connected to member 60 as at pivots 64 and include flanges 65 abutting against member 60 when in the FIG. 8 closed position receiving therein quick release pins 66 of any suitable type. Thus, member 60 can be quickly and easily connected to the framework 12 of the seat portion 11.

Member 60 also includes a pair of spaced roller assembly receiving apertures 67 adjacent each clamp 63 in the side member 60 and a pair of flange plates 68 secured to the upper surface of member 60 above apertures 67. A pair of quick release pins, such as twistable keys 69 are provided on each flange plate 68.

Thus, as seen in FIG. 9, a roller assembly 70 is shown having a main block portion 71 and a pin 72 extending rearwardly thereof. A plate 74 having an elongated slot 75 therein is hingedly connected to block portion 71 at hinge 76 and is articulated or hinged at hinge 77 so that, when pin 72 is inserted into aperture 67 in FIG. 8, plate 74 extends up the side of member 60 and over the top with twist key 69 receivable in slot 75. Turning of key 69 within slot 75 thus holding the assembly 70 of FIG. 9 onto the member 60.

A box frame 78 extends downwardly from the underside of block member 71 having a pin 79 journalled for rotation therein. Pin 79 has an an enlarged head 80 holding it to frame 78 and carries a box-like frame 81 having a roller 82 journalled for rotation therein.

In this manner, the apparatus 70 of FIG. 9 can be quickly and easily added to the car seat portion 11 of the embodiment of FIG. 1, with roller assemblies 70 coupled thereto, to provide front rollers on a preexisting car seat. The modification of FIGS. 8 and 9 can then be provided with removable rear wheels and a handle structure as heretofore described. Wing nuts and other releasable nuts or the like may be used where appropriate.

Although various parts, such as the rear axle, may be welded onto the preexisting car seat structure, it is desirable to make them removable as heretofore described.

Thus, the safety of a child's car seat is combined herein with the mobility of a stroller in a convenient and economical manner. When it is desired to use the device as a regular car seat, the wheels and handles can be removed and the casters or rollers of the FIGS. 1 to 7 embodiments either retracted or removed (or removed in the FIGS. 8 and 9 embodiment). When it is desired to use the device as a stroller, the child may be left in the car seat (if desired), the wheels and handles added and adjusted and the rollers returned to the operative position. The size of the various wheels and rollers may be varied.

Any number of quick release members may be used, such as quick release members used on bicycles to remove wheels therefrom. The handles may be turned inwardly for storage or removed totally. Although casters or rollers have been disclosed for the front end, regular wheels may be used attached as described.

There is thus disclosed unique and novel apparatus for quickly and easily converting a conventional car seat to a stroller, then back to a car seat when desired.

Since certain changes may be made in the above apparatus without departing from the scope of the invention herein involved, it is intended that all matter contained in this above description and shown in the accompanying drawings shall be interpreted as illustrative and not in a limiting sense.

I claim:

1. A child's car seat and apparatus for converting the car seat to a stroller comprising, in combination:

- a car seat having a back portion, a seat portion, and framework for supporting the seat, said framework including a pair of tubular side portions having longitudinally extending, ground engaging support members and tubular rear portions extending upwardly along the back portion of the car seat;
- a handle removably received within each of said tubular rear portions;
- a rear wheel assembly including an axle, a wheel mounted on each end of the axle, and means for removably securing the axle to the framework; and
- a front wheel assembly including an elongated bar of rectangular cross-section having a longitudinally extending cavity formed at each end thereof for receiving one of said ground engaging support members, within each cavity, clamp means for releasably securing a ground engaging support member within each cavity, a pair of caster wheel assemblies, each wheel assembly having a block portion with a pin extending rearwardly therefrom and a vertically extending plate mounted on the top of said block portion, said plate having a hinged portion with a slot therein, a pair of apertures located on the front surface of said elongated bar for receiving said rearwardly extending pins, and a twistable key mounted on the upper surface of said elongated bar adjacent each said aperture, said twistable key being adapted to be received in the slot of said hinged portion for releasably securing each said caster wheel assembly to said elongated bar.

* * * * *